(Model.)

P. P. COLER.
Mower.

No. 234,965. Patented Nov. 30, 1880.

WITNESSES
Chas. Nida
C. Sedgwick

INVENTOR:
P. P. Coler.
BY Munn & Co.
ATTORNEYS.

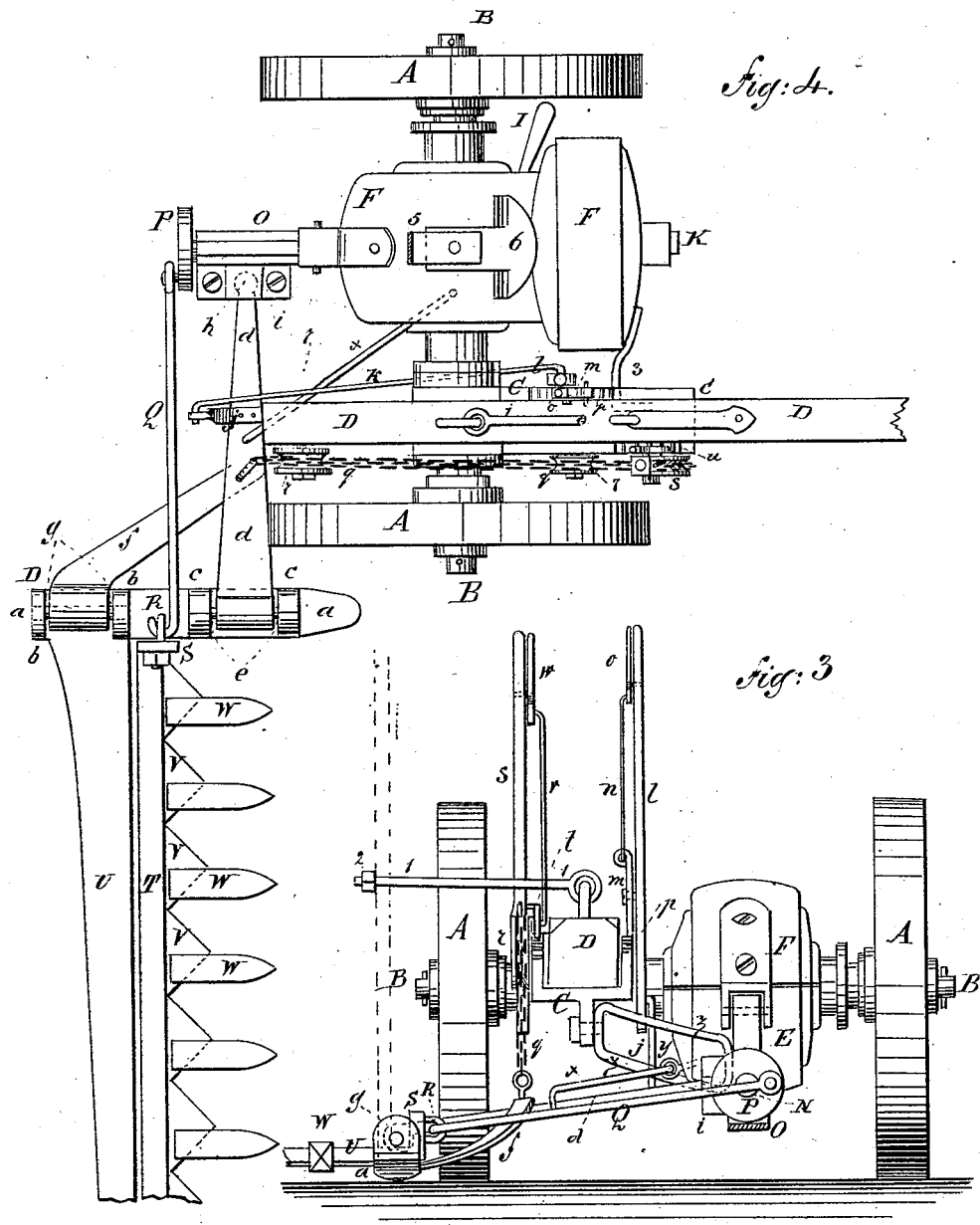

UNITED STATES PATENT OFFICE.

PETER P. COLER, OF CLYMAN, WISCONSIN.

MOWER.

SPECIFICATION forming part of Letters Patent No. 234,965, dated November 30, 1880.

Application filed July 14, 1880. (Model.)

*To all whom it may concern:*

Be it known that I, PETER PAUL COLER, of Clyman, in the county of Dodge and State of Wisconsin, have invented a new and useful Improvement in Mowers, of which the following is a specification.

Figure 1:
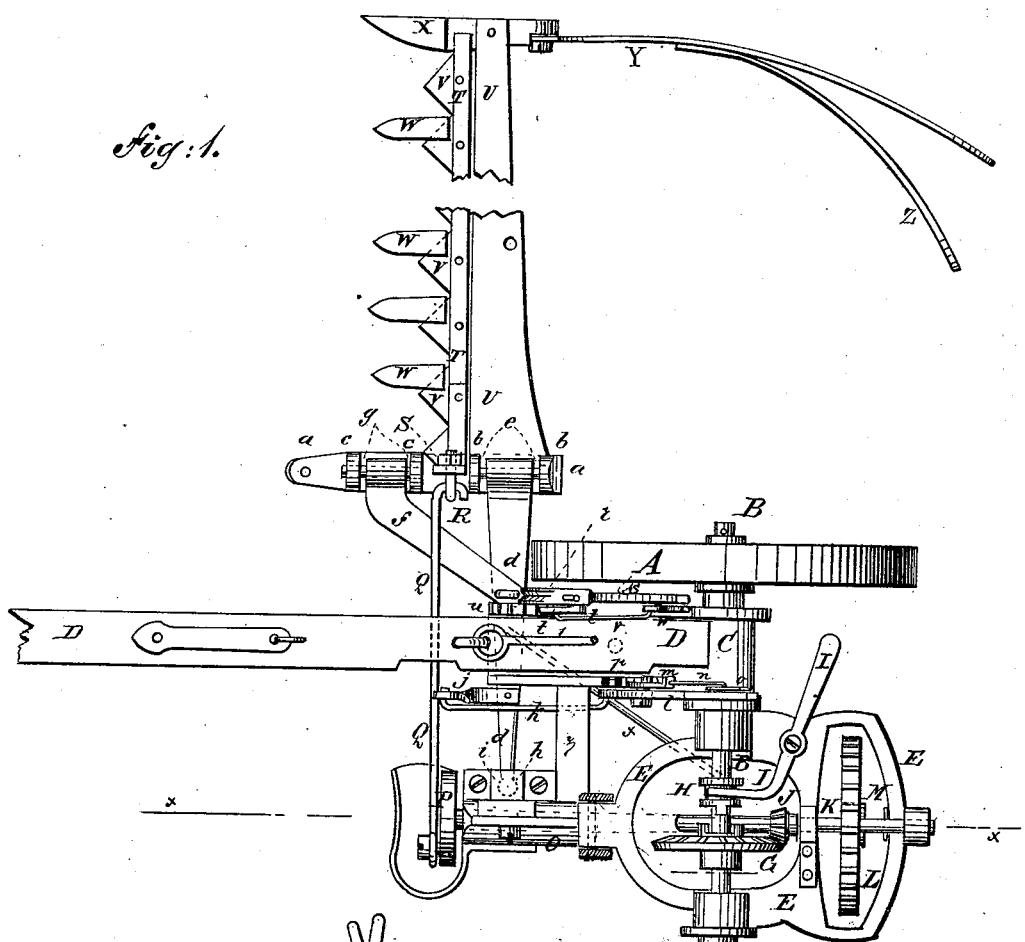
Figure 2:
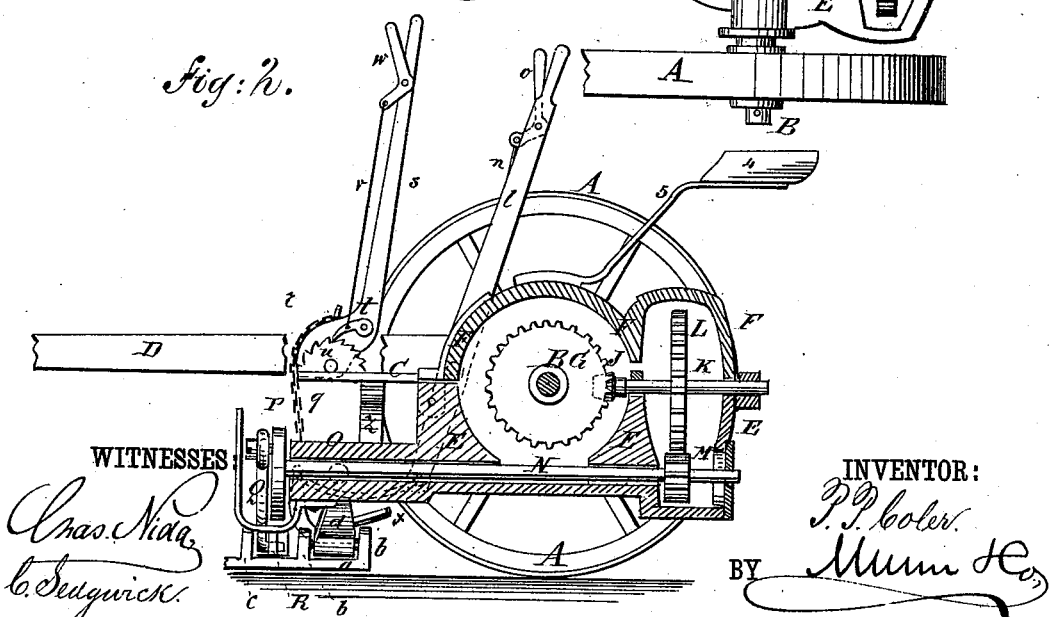

Figure 1, Sheet 1, is a plan view of the improvement arranged as a front-cut mower. Fig. 2, Sheet 1, is a sectional side elevation taken through the line $x\,x$, Fig. 1. Fig. 3, Sheet 2, is a front elevation. Fig. 4, Sheet 2, is a plan view of the improvement arranged as a rear-cut mower.

The object of this invention is to furnish mowers so constructed that they may be readily adjusted as front-cut or rear-cut machines.

Similar letters of reference indicate corresponding parts.

A are the wheels, one of which runs loose upon the axle B, and the other is rigidly attached to the said axle, so that the said wheel will carry the said axle with it in its revolution. The axle B revolves in bearings in the rear end of the plate C, to which the tongue D is bolted. The axle B also passes through bearings formed in the lower part, E, of the gearing-box, the upper part, F, of which is hinged at its forward end to the forward end of the said lower part, E, so that it can be readily turned back to give convenient access to the gearing.

The inner side of the bearing of the tongue-piece C has a flange provided with bolt-holes formed upon it, and each bearing of the gearing-box E F has a flange provided with bolt-holes formed upon it, so that the said gearing-box can be bolted to the said tongue-piece, whichever end of the gearing-box be placed forward.

Upon the axle B, within the forward chamber of the gearing-box E F, is placed a large beveled-gear wheel, G, and upon the said axle, within the said gearing-box, is placed a clutch, H, which can slide upon the axle B, but will be carried around by and with the said axle in its revolution.

Around the hub of the clutch H is formed a ring-groove to receive the forked inner end of the bent clutch-lever I, which is pivoted at its bend or angle to the edge of the lower part, E, of the gearing-box. The clutch-lever I works in a notch in the edge of the upper part, F, of the gearing-box, and its outer end projects into such a position that it can be readily reached and operated by the driver from his seat to throw the machine into and out of gear.

The teeth of the large beveled-gear wheel G mesh into the teeth of the small beveled-gear wheel J, attached to the inner end of the shaft K, which is placed at right angles with the axle B, and revolves in bearings attached to the lower part, E, of the gearing-box.

To the shaft K, within the outer chamber of the gearing-box E F, is attached a large gear-wheel, L, the teeth of which mesh into the teeth of the small gear-wheel M, attached to the shaft N. The shaft N is placed parallel with the shaft K and revolves in bearings in the lower part of the gearing-box E F, and in the arm O, formed upon or attached to the said gearing-box.

To the forward end of the shaft N is attached the crank-wheel P, to which is pivoted the inner end of the pitman Q. The outer end of the pitman Q is hooked into the eye of an eyebolt, R, which is swiveled to a lug, S, attached to the inner end of the sickle-bar T. The sickle-bar T slides upon the finger-bar U, and its sickles V work in the slots of the fingers W, attached to the said finger-bar U in the ordinary manner.

X is the outer shoe, which is attached to the outer end of the finger-bar U, and is provided with a dividing-board, Y, in the ordinary manner. The dividing-board Y is provided with a handle, Z, for convenience in raising it from the ground when desired.

$a$ is the inner shoe, which is attached to the inner end of the finger-bar U, and has two pairs of lugs, $b\,b\,c\,c$, formed upon the forward and rear parts of its upper side.

To and between the rear lugs, $b$, is hinged the outer end of the bar $d$ by a bolt or pin, $e$, and to and between the forward lugs, $c$, is hinged the outer end of the brace-arm $f$ by a pin or bolt, $g$. The inner end of the brace-arm $f$ is formed upon or rigidly attached to the bar $d$ at a little distance from its outer end, and is designed to hold the finger-bar against the back-pressure.

Upon the inner end of the bar $d$ is formed a ball, $h$, which works in a socket, $i$, bolted detachably to the arm O of the gearing-box E F. The ball-and-socket connection $h\ i$ allows the bar $d$ to be turned or tilted to raise and lower the front of the finger-bar U to cause the sickles V to cut the grass farther from and closer to the ground, as circumstances may require.

To the bar $d$ is rigidly attached the lower end of an upwardly-projecting arm, $j$, to the upper end of which is hinged the end of a short rod, $k$. The other end of the rod $k$ is hinged to the lower end of a lever, $l$, which is provided with a sliding pawl, $m$.

To the upper end of the pawl $m$ is pivoted the lower end of the connection-rod $n$, the upper end of which is pivoted to the end of the short arm of a small bent lever, $o$. The lever $o$ is pivoted at its angle to the upper part of the lever $l$ in such a position that it can be operated by the hand operating the said lever $l$. The lower end of the pawl $m$ engages with notches in the convex edge of a bar, plate, or flange, $p$, attached to or formed upon the tongue-piece C. With this construction the driver, by operating the lever, can tilt or raise and lower the forward edge of the finger-bar U to cause the sickles V to cut the grass farther from or closer to the ground.

To the connecting-bar $d$, at the inner side of the wheel A, is attached the end of a chain, $q$, the other end of which passes around and is attached to the eccentric $r$, so that the finger-bar U and its attachments can be raised from and lowered to the ground by operating the said eccentric $r$.

To the eccentric $r$ is attached, or upon it is formed, a lever, $s$, to which is pivoted a pawl, $t$, to engage with the teeth of a catch-plate, $u$, attached to or formed upon the tongue-piece C, so as to hold the finger-bar securely in place when raised.

To the pawl $t$ is attached the lower end of a rod, $v$, the upper end of which is attached to the short arm of a bent lever, $w$, pivoted at its angle to the lever $s$, with its long arm projecting into such a position that it may be grasped and operated to withdraw the pawl $t$ from the catch-plate $u$ by the hand that operates the said lever $s$.

The draft-strain upon the finger-bar U is further sustained by the brace-rod $x$, the forward end of which is hooked into a hole in the bar $d$, or is otherwise connected with the said bar. The other end of the brace-rod $x$ is hooked into an eyebolt, $y$, screwed into the lower part, E, of the gearing-box, or into some other support attached to the said gearing-box.

The machine is further strengthened by the brace $z$, attached to a lug or flange upon the under side of the tongue-piece C and to the side of the arm O of the gearing-box E F.

To the tongue D is hinged the end of a rod, 1, the other end of which has a screw-thread formed upon it to receive a nut, 2. When the finger-bar U is turned up into a vertical position the end of the rod 1 can be passed through a hole in the finger-bar U and the nut 2 screwed upon the said end, so as to hold the said finger-bar in a vertical position while taking the machine from place to place.

I have thus far described the mower when arranged as a front-cut machine, and will now describe the adjustments necessary to change it to a rear-cut machine. The left-hand drive-wheel A is taken off, and the bolts that secure the gearing-box E F to the tongue-piece C are taken out. The socket and ball $i\ h$ are then detached from the arm O of the gearing-box E F, the brace-rod $x$ is unhooked, and the eyebolt $y$, that the brace-rod $x$ hooked into, is detached and attached to the other side of the gearing-box E F. The gearing-box E F is then drawn off, the axle B is reversed, and again put on the said axle B and bolted fast to the tongue-piece C. The ball and socket $h\ i$ are then bolted to the right-hand side of the rearwardly-projecting arm O of the gearing-box E F, and the brace-rod $x$ is hooked into the eye of the eyebolt $y$. The tongue-brace 3 is then bolted at one end to the lug or flange upon the lower side of the tongue-piece C, and at the other end is bolted to the gearing-box E F. The seat 4 is then turned around by removing the bolt that secures the lower end of the standard 5 to the top of the gearing-box E F, and the foot-rest 6 is bolted on. The rollers 7 are then pivoted to the side of the tongue D, the tongue D is slid back and bolted to the tongue-piece C, and the chain $q$ is passed around the rollers 7 and again attached to the bar $d$.

It will be observed that when the machine is adjusted as a rear-cut machine the bar and brace $d\ f$ are turned over, so as to bring the brace $f$ to the rear side of the said bar $d$ to keep the said brace $f$ out of the way of the wheel A. The peculiar construction of the inner shoe, $a$, allows this to be done by removing the pins or bolts $e\ g$, turning the bar $d$ over and replacing the said pins or bolts $e\ g$. The arrangement of the pitman Q and the levers $l\ s$ is the same in both adjustments.

Having thus fully described my invention, I claim as new and desire to secure by Letters Patent—

In a mower, the combination, with the axle B, the shafts K N, the gearing G J L M, and the connecting-bar $d$, of the gearing-box E F, made in two parts, having arm O, and a bolt-receiving flange at each side, substantially as herein shown and described, whereby the gearing-box can be reversed in changing the mower from a front-cut to a rear-cut machine, as set forth.

PETER PAUL COLER.

Witnesses:
P. H. DUFFY,
JAMES DUFFY.